(12) United States Patent
Polcha et al.

(10) Patent No.: US 8,160,307 B2
(45) Date of Patent: Apr. 17, 2012

(54) RECOVERABLE BIOMETRIC IDENTITY SYSTEM AND METHOD

(76) Inventors: Andrew J. Polcha, Lovettsville, VA (US); Michael P. Polcha, Lovettsville, VA (US)

( * ) Notice: Subject to any disclaimer, the term of this patent is extended or adjusted under 35 U.S.C. 154(b) by 998 days.

(21) Appl. No.: 11/976,117

(22) Filed: Oct. 19, 2007

(65) Prior Publication Data

US 2009/0175506 A1 Jul. 9, 2009

(51) Int. Cl.
*G06K 9/00* (2006.01)
*G10L 17/00* (2006.01)
(52) U.S. Cl. ....... 382/115; 340/5.52; 340/5.82; 704/246
(58) Field of Classification Search ........................ None
See application file for complete search history.

(56) References Cited

U.S. PATENT DOCUMENTS

| | | | | |
|---|---|---|---|---|
| 4,414,684 A * | 11/1983 | Blonder | ........................ | 382/127 |
| 5,222,153 A * | 6/1993 | Beiswenger | .................. | 382/127 |
| 5,963,657 A * | 10/1999 | Bowker et al. | ................. | 382/127 |
| 6,373,969 B1 * | 4/2002 | Adler | ............................ | 382/127 |
| 6,836,554 B1 * | 12/2004 | Bolle et al. | .................... | 382/116 |
| 7,120,607 B2 * | 10/2006 | Bolle et al. | ....................... | 705/64 |
| 7,822,238 B2 * | 10/2010 | Bolle et al. | .................... | 382/124 |
| 2004/0019570 A1 * | 1/2004 | Bolle et al. | ....................... | 705/64 |
| 2004/0218789 A1 * | 11/2004 | Polcha et al. | ................. | 382/124 |
| 2004/0264746 A1 * | 12/2004 | Polcha et al. | ................. | 382/124 |
| 2006/0133651 A1 * | 6/2006 | Polcha et al. | ................. | 382/115 |
| 2006/0136743 A1 * | 6/2006 | Polcha et al. | ................. | 713/186 |
| 2009/0175508 A1 * | 7/2009 | Connell et al. | ................ | 382/118 |
| 2009/0175513 A1 * | 7/2009 | Bolle et al. | .................... | 382/125 |

* cited by examiner

*Primary Examiner* — Bhavesh Mehta
*Assistant Examiner* — Barry Drennan
(74) *Attorney, Agent, or Firm* — Doster Greene, LLC

(57) ABSTRACT

A method for identifying persons based on biometric data achieves enhanced security and increased accuracy compared with other systems by distorting one or more biometrics prior to detection and recognition. The method includes detecting a distorted biometric for input into an identification system, comparing the distorted biometric to one or more distortion patterns, and determining an identity of the person based on results of the comparison. The biometric may be an eye pattern, a fingerprint or palm print, a voice print, a handwriting sample, a DNA sample, a facial image, or any other type of characteristic or behavioral attribute of a person. The biometric may be distorted in any one of a variety of ways for comparison to previously enrolled biometrics which have been distorted using the same or similar element. A system and program embodied within a computer-readable medium performs the steps of the method.

23 Claims, 15 Drawing Sheets

RECOVERABLE BIOMETRIC IDENTITY SYSTEM AND METHOD

REFERENCE TO RELATED APPLICATIONS

This application claims benefit of provisional U.S. Patent Application No. 60/470,204 filed on May 14, 2003. The contents of this provisional application is incorporated by reference herein.

BACKGROUND OF THE INVENTION

1. Field of the Invention

This invention generally relates to identification systems, and more particularly to a system and method for identifying persons based on biometric data. The invention also relates to a system and method for controlling access to a restricted item based on personnel biometric data.

2. Description of the Related Art

The ability to perform secure transactions, control access to restricted areas, and protect the dissemination of information are paramount concerns in the public and private sector. While various approaches have been developed to address these concerns, one approach which has proven to be particularly effective involves the use of biometrics.

Biometric systems use automated methods of verifying or recognizing the identity of persons based on some physiological characteristic (e.g., a fingerprint or face pattern) or aspect of behavior (e.g., handwriting or keystroke patterns). In its most basic form, this is accomplished in three steps. First, one or more physiological or behavioral traits are captured and stored in a database. Second, the biometric of a particular person to be identified is compared to the information in the database. Finally, a negative or positive confirmation is returned based on results of the comparison.

Because personal characteristics or behavioral aspects are considered unique, biometric systems have proven to provide an enhanced measure of protection compared with password- and PIN-based systems. This enhanced security comes in several forms. For example, the person to be identified is required to be physically present at the point-of-identification. Visual or physiological confirmation therefore takes place instead of a mere numerical comparison. Also, biometric identification is beneficial to the user because it obviates the need to remember a password or carry a token.

While existing biometric systems have proven effective, they are not without drawbacks. Perhaps most significantly, these systems can be breached using stolen biometric data. Consider, for example, a biometric system which performs identification based on employee fingerprints. In order to gain unauthorized access, a thief can obtain a sample of an employee's fingerprint (e.g., off of a glass) with relative ease and then present that sample to a system fingerprint reader. Unable to determine the source of the fingerprint, the system will grant access to the thief to thereby causing a breach. Existing biometric systems have also proven to be inaccurate because they are one-dimensional in nature, e.g., they perform identification verification based on only form of biometric data.

Due at least in part to the tragic events of 9/11, the use of biometrics systems is expected to increase dramatically in the coming years. In fact, according to the International Biometric Industry Association, the biometrics market has been projected to jump from $165 million in 2000 to $2.5 billion by 2010. This jump will inevitably involve using biometric systems in new applications including the prevention of unauthorized access or fraudulent use of ATMs, cellular phones, smart cards, desktop PCs, workstations, and computer networks.

In view of the foregoing considerations, it is apparent that there is a need for a biometric-based system and method which is more secure than other systems and methods which have been proposed, and more particularly which achieves this improved security based on the use of multiple degrees of uniqueness for achieving identification confirmation.

SUMMARY OF THE INVENTION

An object of the present invention is to provide an improved system and method for identifying persons using biometric information.

Another object of the present invention is to provide a system and method for identifying persons using biometric information which is more secure than existing systems and methods.

Another object of the present invention is to provide a system and method of the aforementioned type which demonstrates a greater resilience to fraudulent attack from unauthorized personnel.

Another object of the present invention is to provide a system and method for identifying persons using biometric information which is more accurate than other systems which have been proposed.

Another object of the present invention is to provide a system and method for identifying persons using biometric information which achieves improved accuracy by considering multiple degrees of uniqueness, based solely on biometric data or on a combination of biometric data and one or more unique attributes.

Another object of the present invention is to provide a system and method of the aforementioned type which is sufficiently flexible to perform personal identification confirmation based on virtually any type of biometric.

Another object of the present invention is to provide a computer-readable medium containing an application program which controls a processing system to automatically perform identification confirmation in any of the aforementioned ways.

These and other objects and advantages of the present invention are achieved by providing an identification method which includes detecting a distorted biometric for input into an identification system, comparing the distorted biometric to one or more distortion patterns, and determining an identity of the person based on results of the comparison. The biometric may be an eye pattern, a fingerprint or palm print, a voice print, a handwriting sample, a DNA sample, a facial image, or any other type of characteristic or behavioral attribute of a person. The biometric may be distorted in any one of a variety of ways for comparison to previously enrolled biometrics which have been distorted using the same or similar element.

The present invention also provides an identification system which includes a detector that captures a distorted biometric of a person and a processor which compares the distorted biometric to one or more distortion patterns and determines an identity of the person based on results of the comparison. The biometric may be an eye pattern, a fingerprint or palm print, a voice print, a handwriting sample, a DNA sample, a facial image, or any other type of characteristic or behavioral attribute of a person. The biometric may be distorted in any one of a variety of ways for comparison to previously enrolled biometrics which have been distorted using the same or similar element.

The present invention is also a computer-readable medium which includes a program for performing an identification function. The program includes a first code section for comparing a signal indicative of a combination of two or more unique identity attributes to one or more identity patterns, at least one of the unique identity attributes corresponding to a biometric of a person, and a second code section for determining an identity of a person based on results of the comparison.

By distorting the biometric before it is input into the system, the present invention ensures that system security cannot be breached by theft of the biometric itself. The distortion element therefore in effect serves as a key which when combined with the biometric provides two degrees of uniqueness which must be satisfied before a positive identification result can be conformed. Moreover, if the distorted biometric of a person is ever lost or stolen, the present invention can easily re-enroll biometrics into the system or switch to a different previously enrolled biometric altered using a different unique distortion element. Additional embodiments contemplated combining three or more degrees of uniqueness for providing an even greater level of security.

DESCRIPTION OF THE PREFERRED EMBODIMENTS

The present invention is a system and method for identifying a person based on biometric data which has been encoded or otherwise uniquely modified for the purpose of preventing fraud and enhancing security. The present invention is also a system and method for identifying a person based on the combination of two or more unique identity attributes, at least one of which is a biometric which is either coupled with or modified by the second attribute. The present invention is also computer-readable medium storing a program that implements one or more of the methods described herein. Whether taken collectively or individually, the embodiments of the present invention combine multiple degrees of uniqueness to provide a greater degree of security and resistance to fraud than other systems which have been proposed.

Figure 1:
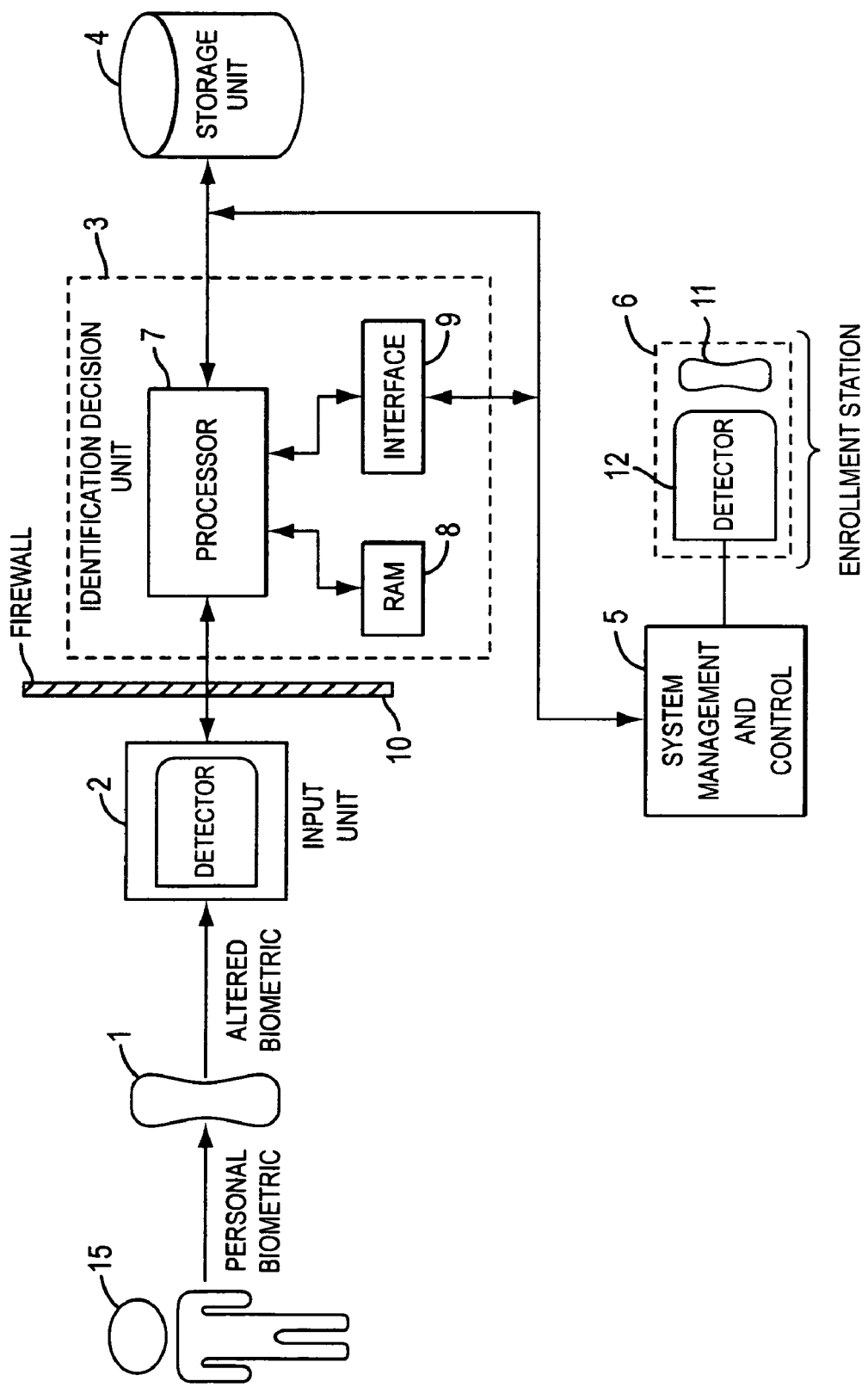
FIG. 1 is a diagram showing a biometric identification system in accordance with one embodiment of the present invention.

FIG. 1 shows an identification system according to one embodiment of the present invention. This system includes a distortion element 1, an input unit 2, an identification decision unit 3, a storage unit 4, a system management controller 5, and an enrollment station 6. These elements may be provided at separate locations and linked together by any number of wireline or wireless connections, or the elements may be combined to form a single integrated unit sized to fit a particular application. In this integrated form, element 1 may be included within or adjacent the input unit. However, amore preferable alternative may be to allow this element to be carried by persons to be identified, much in the same way a key or employee identity badge is carried. In this latter case, the distortion element may be adapted to fit over and/or be removably coupled to the input unit, the element may be held by the user between the biometric source and the input unit, or may otherwise be situated.

Structurally, the distortion element is selected to coincide with the type of biometric obtained from a person whose identity is to be determined, illustratively shown by reference numeral 15. In embodiments of the invention discussed below, specific types of distortion elements are identified. While these embodiments are considered advantageous for a variety of applications, they are not to be limiting of the invention in anyway. Rather, it is sufficient to acknowledge that the distortion element may be one capable of imposing any form of distortion on a biometric. This distortion includes but is not limited to non-linear distortion, various types of modulation, and/or one or more forms of encoding imposed mechanically, optically, electrically, or through mathematical or signal processing techniques.

Irrespective of the type of distortion imposed, the purpose of the distortion element is to alter the form of the biometric as received from its source, so that the biometric as presented to the system decision unit is different from its original form. This ensures that inputting a person's biometric directly into the system will always result in failed recognition, which is beneficial from the standpoint of protecting the integrity of the host system from unauthorized breach as well as for a variety of other purposes.

The input unit includes a detector for detecting or otherwise receiving the distorted biometric output from the distortion element. The input unit may be as small or large as necessary to be compatible with the host system. When the identification system is used for security access purposes, the input unit may be incorporated within a panel which optionally but preferably includes a display or indicator that provides information, instructions, and/or messages to each person presenting a modified biometric for identification. The particular input unit used depends on the type of modified biometric generated by the distortion element. Non-limiting examples are identified in embodiments which follow.

The storage unit stores information for each person to be identified by the system. This information includes an identity pattern that corresponds to a distorted biometric obtained during an enrollment process and optionally but desirably one or more other forms of identifying data (e.g., PIN or other access number or password, social security number, driver's license number, address, citizenship, marital status, and/or other forms of personal information that may be used as an independent basis for identification). If desired, unit 4 may store multiple identity patterns for each person, where each pattern is generated using a different distortion element. This provides a degree of flexibility to the system while simultaneously enhancing security. For example, a system manager or system software may change the distortion element to be used and thus the identity patterns to be searched, for example, on a periodic basis or when a breach of the host system has occurred.

The storage unit may be a database included within or externally connected to the identification decision unit via a wireless or wireline communications link. Alternatively, the storage unit may be a memory chip storing the identity patterns for each person presented for identification. This latter case is preferable when, for example, the system is formed as an integrated unit. Those skilled in the art can appreciate that other forms of storage devices may be used to store the identity patterns in accordance with the present invention.

The identification decision unit compares the distorted biometric received from the input unit with one or more identity patterns in the storage unit. The comparison function is performed by a processor 7 under control of an application program stored in a memory 8. The type of comparison performed depends on the type of distorted biometric received. The comparison may, for example, involve a spectrum signal analysis or a pattern recognition analysis performed using a neural network, statistical model, or other type of signal processing technique. Examples of comparison algorithms are discussed in embodiments which follow. As an added measure of security, the identification decision unit may be protected by a firewall and an interface unit 9 may be included for transmitting or receiving data, instructions, or other information from the system management controller.

The enrollment station captures new distorted biometrics for persons who are already registered in the system and for persons to be added. The enrollment station includes a distortion element 11 for distorting biometric as received from its source and a detector 12 for receiving the distorted biometric. In order for positive identification to occur, a person must at a minimum present the same biometric using the same distortion element as was presented during enrollment, e.g., the same type of distortion must be performed by elements 1 and 11 on the same biometric. The identification system of the present invention thus may be said to require at least two unique identity attributes to be presented in proper combination in order for a positive identification to occur, where the first and second unique attributes correspond to the biometric and the specific type of distortion imposed on the biometric. While the enrollment station is depicted to be separate from detector 2, those skilled in the art can appreciate that enrollment may also be performed by this detector.

The system management controller generates new identity patterns from the distorted biometrics obtained from the enrollment station. These patterns are then forwarded to the storage unit. The controller also performs a number of other management functions. For example, when multiple identity patterns (e.g., distorted biometrics) are stored for each person, the controller may specify which distorted biometric type is to be used by the decision unit for identification.

To illustrate, consider the case where each person has enrolled two distorted biometrics into the system. The biometrics may differ based on the use of different distortion elements for the same biometric, use of the same distortion element for different biometrics, or different distortion elements for different biometrics. The system management controller may control which type of distorted biometric may be used on any given day or under any given set of circumstances for identification. For example, an eye retina scan through a first nonlinear distortion element may be system active one day and an eye retina scan through a second nonlinear distortion element may be system active on another day. A positive identification will only result by inputting the correct distorted biometric into the system. The system controller manages which distorted biometric will be active based on direct input from a system administrator or based on instructions which have been programmed into the processor control software, e.g., on a periodic basis, in the event that a host system breach has occurred, etc.

In addition to these functions, the system controller may be used to edit and/or delete identity patterns or other identification information in the storage unit. Also, this controller may control the input unit in terms of when it is active and what messages, information, or other data is to be displayed. If multiple detectors are included in the input unit, the control may also designate which detector is to be activated.

Figure 2:
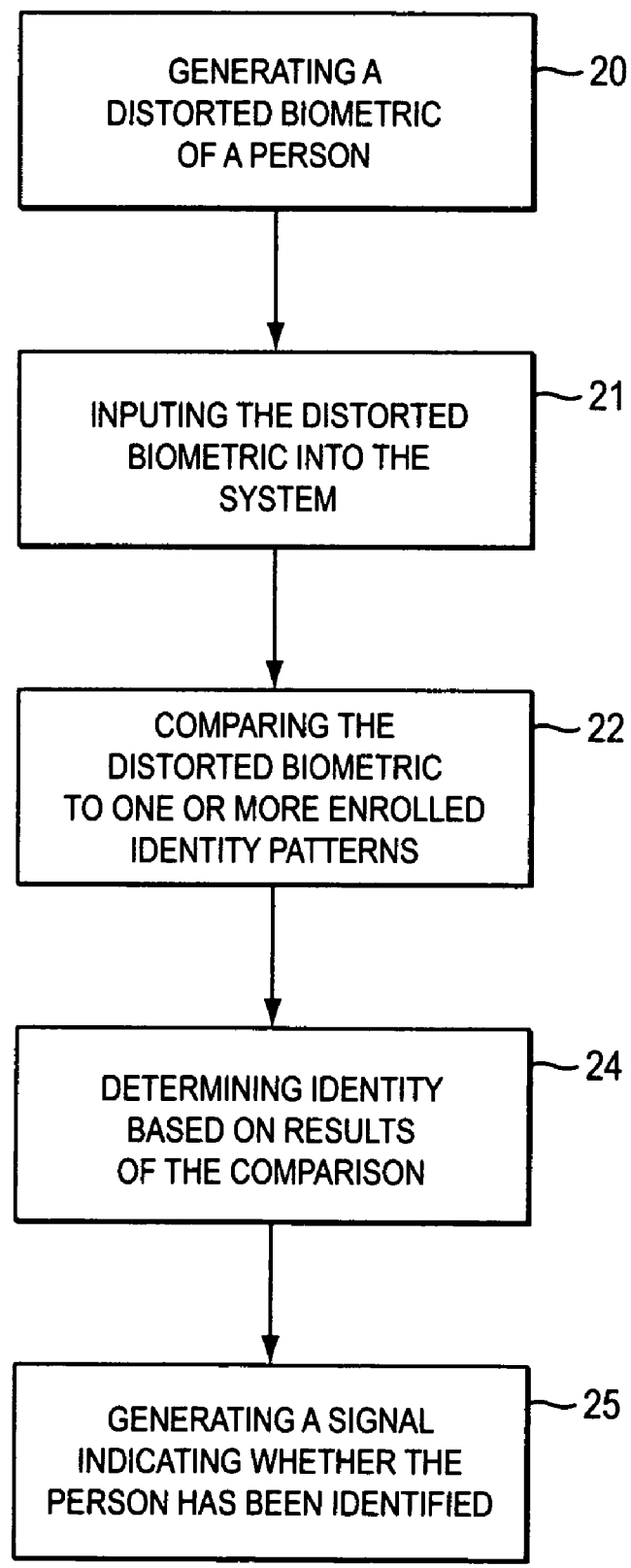
FIG. 2 is a diagram showing steps included in a biometric identification method in accordance with one embodiment of the present invention.

FIG. 2 shows steps included in one embodiment of an identification method of the present invention, which may be performed using the system shown in FIG. 1. An initial step of this method includes generating a distorted biometric of a person. (Block 20). The distorted biometric is generated using a distortion element which is selected to be compatible with the biometric. For example, if the biometric is an eye pattern, a nonlinear distortion lens may be used as the distortion element. If the biometric is a fingerprint, the distortion element may include a filter which modulates a surface wave using the fingerprint. Other types of distortion elements or forms of distortion may also be used.

A second step includes inputting the distorted biometric into the input unit of the identification system. (Block 21). This may be accomplished in a variety of ways depending on the type of biometric and/or the type of distortion element imposed on the biometric. For example, in the case where the biometric is an eye pattern (e.g., retina or iris) and the distortion element is a lens having a non-linear refractive pattern, the distorted eye pattern as viewed through the lens may be captured by a detector (e.g., scanner, camera, CCD array, or other imaging system) included in the input unit of the identification system. The detector converts the captured pattern into an electrical spectrum signal for comparison by the decision unit. In the case where the biometric is a voice sample and the distortion element is a voice scrambler, the distorted voice pattern would be converted into an electrical spectrum signal by a microphone in the input unit of the system. The signal would then be input into the decision unit for analysis. Other examples of how a distorted biometric may be captured, detected, or otherwise input into the system are discussed in the specific embodiments which follow.

A third step includes comparing the distorted biometric signal received from the input unit to one or more identity patterns stored in the storage unit. (Block 22). This step is performed by decision unit 3, which searches the distorted biometrics in the stored identity patterns previously enrolled. As previously indicated, the comparison performed depends on the specific type of distorted biometric received. This may involve, for example, various forms of spectrum or pattern analyses. Specific embodiments are discussed below.

A fourth step includes determining an identity of the person who input the distorted biometric into the system. (Block 23). The identity is determined based on results obtained from the comparison performed by the decision unit. If the distorted biometric signal matches one of the identity patterns, then the identity of the person may be determined from the personal information stored in that person's electronic file. Under ideal circumstances, the processor search would result in only one match for each authorized person. However, because of inconsistencies and other adverse influences, it is possible that multiple matches are found. In this case, the processor may be programmed to conclude that there is no match because of an ambiguity. Conversely, the processor may programmed to conclude that for purposes of the host system, any match is sufficient and therefore multiple matches result in an acknowledgment that the person is a person recognized by the system. If no match is produced from the processor search, the system may conclude that the person is an unidentified person and action may be taken accordingly.

A fifth step includes generating a signal indicating whether the person who input the distorted biometric into the system has been identified or not. (Block 25). If the person has been identified, the processor generates an acknowledgment signal which may be used, for example, to grant the person access to a restricted area, system, or other item. The acknowledgment signal may also cause the input unit to display a predetermined message indicating that the person has been identified and that access will now be granted. If the person has not been identified, a non-acknowledgment signal may be generated for the purpose of denying access to the person and/or to generate a message indicating the same.

Figure 3A:
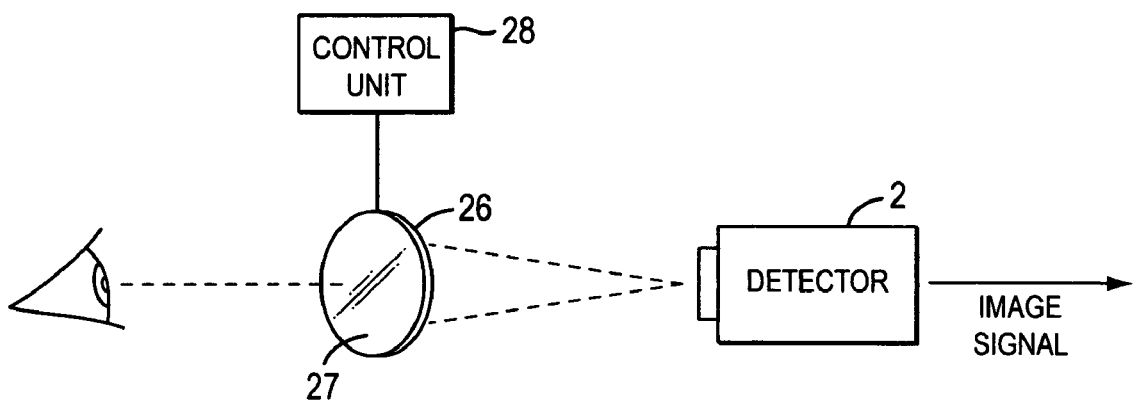
FIG. 3(a) is a diagram showing an identification system which operates based on a first type of distorted eye pattern in accordance with one embodiment of the present invention.

FIG. 3(a) shows an identification system adapted to receive an altered biometric in the form of a distorted eye pattern in accordance with one embodiment of the present invention. The eye pattern (e.g., iris, retina) is distorted by a lens 26 having diffraction grating 27 formed thereon through application of a voltage signal from control unit 28. The diffraction pattern alters the eye pattern from its original pattern, and the resulting image is captured by a detector, which, for example, may be a CCD array. The resulting image signal is then input into the remaining elements of the system shown in FIG. 1.

Figure 3B:
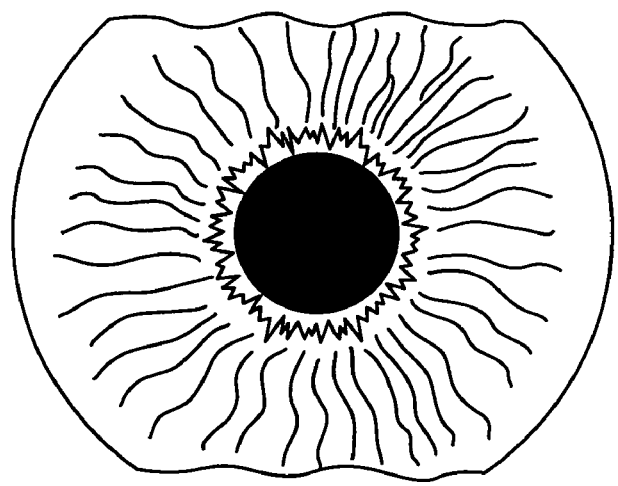
FIG. 3(b) is a diagram of the first eye pattern which may be subject to distortion by the present invention.

The identification decision unit identifies the eye pattern contained in the image signal and then compares the pattern to one or more enrolled eye pattern images stored in the database. Eye pattern recognition may be performed using any known technique, a non-limiting example of which is disclosed in the article entitled *How Iris Recognition Works*, University of Cambridge, The Computer Laboratory, by John Daugman. Techniques for performing eye pattern image comparison are also well known, any one of which may be used in accordance with the present invention. An example includes the one disclosed in *Iris Matching Engine, and Search Speed*. FIG. 3(b) shows a sample iris pattern not unlike one which may be captured by detector 2 in the identification system of the present invention.

Figure 3C:
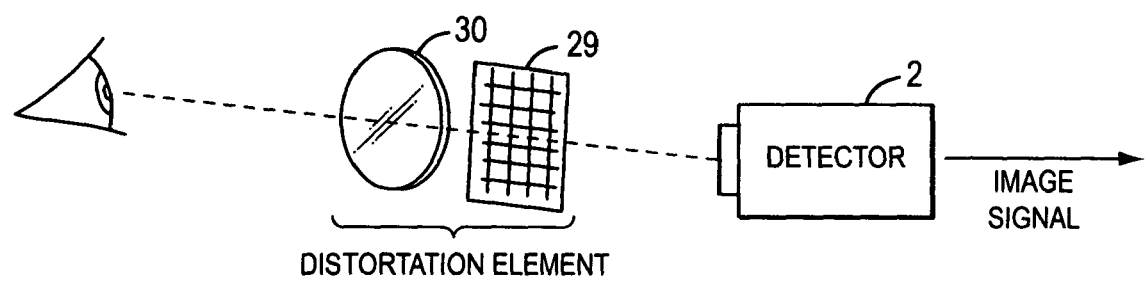
FIG. 3(c) is a diagram showing an identification system which operates based on a second type of distorted eye pattern in accordance with the present invention.
Figure 3D:
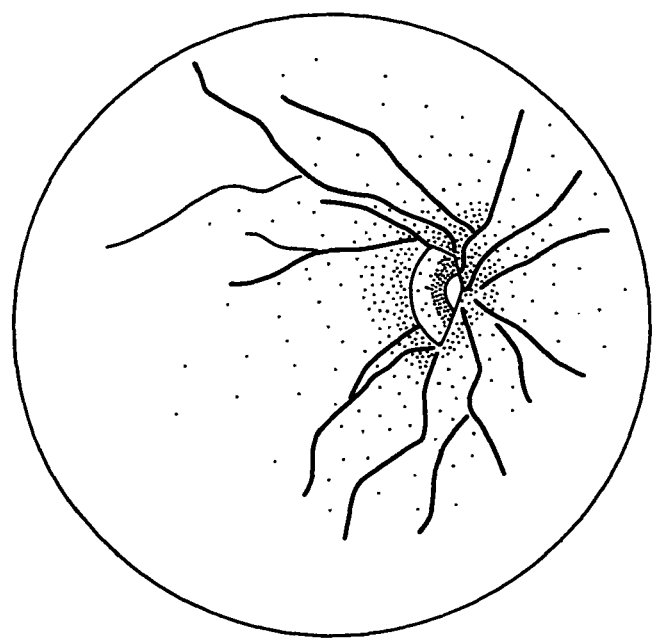
FIG. 3(d) is a diagram of the second eye pattern which may be subject to distortion by the present invention.

FIG. 3(c) shows a variation where the diffraction grating is incorporated within an optical element 29 separate from a collimating lens 30. In this embodiment, the diffraction grating provides the distortion of the eye pattern captured by camera 2. An image signal corresponding to this distorted pattern is then input into the identification decision unit. While a diffraction grating is specifically shown behind lens 30 along the optical path, those skilled in the art can appreciate that optical element 29 may be located in front of this lens. Also, instead of a diffraction grating, element 29 may be any one of a number of polarizers, polarization converters, light modulators, scatterers, refractors, or other optical elements which taken alone or in combination are capable of altering an eye pattern in a predetermined way. FIG. 3(d) shows an image of a retina scan that may be distorted, captured, and then compared in accordance with the present invention.

Figure 4A:
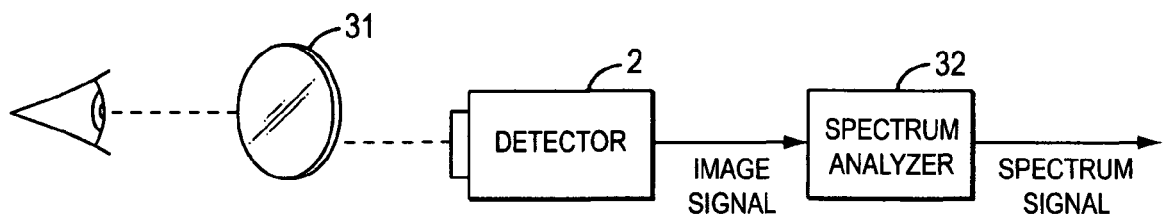
FIG. 4(a) is a diagram showing another identification system which operates based on a distorted eye pattern in accordance with one embodiment of the present invention.

FIG. 4(a) shows an identification system adapted to receive an altered biometric in the form of a distorted eye pattern in accordance with another embodiment of the present invention. The eye pattern (e.g., iris, retina) is distorted by a lens 31 having nonlinear distortion optics, which refracts the eye pattern in a way which alters its original pattern. An image of the distorted eye pattern is captured by a detector (e.g., a CCD array) and transformed into an image signal. This signal is then analyzed in unit 32 to derive a spectrum signal which is input into the remaining elements of the system shown in FIG. 1. Spectrum signals of this type and the manner in which they are generated is well known in the art. Examples of techniques for generating eye spectrum signals include but are not limited to those described in: *Scanning Laser Doppler Flowmetry: Principle and Technique*, pages by Gerhard Zinser, taken from the text *Current Concepts on Ocular Blood Flow in Glaucoma*, pages 197-204, Kugler Publications (1999).

The lens may be incorporated within an eyepiece carried by the person.

Figure 4B:
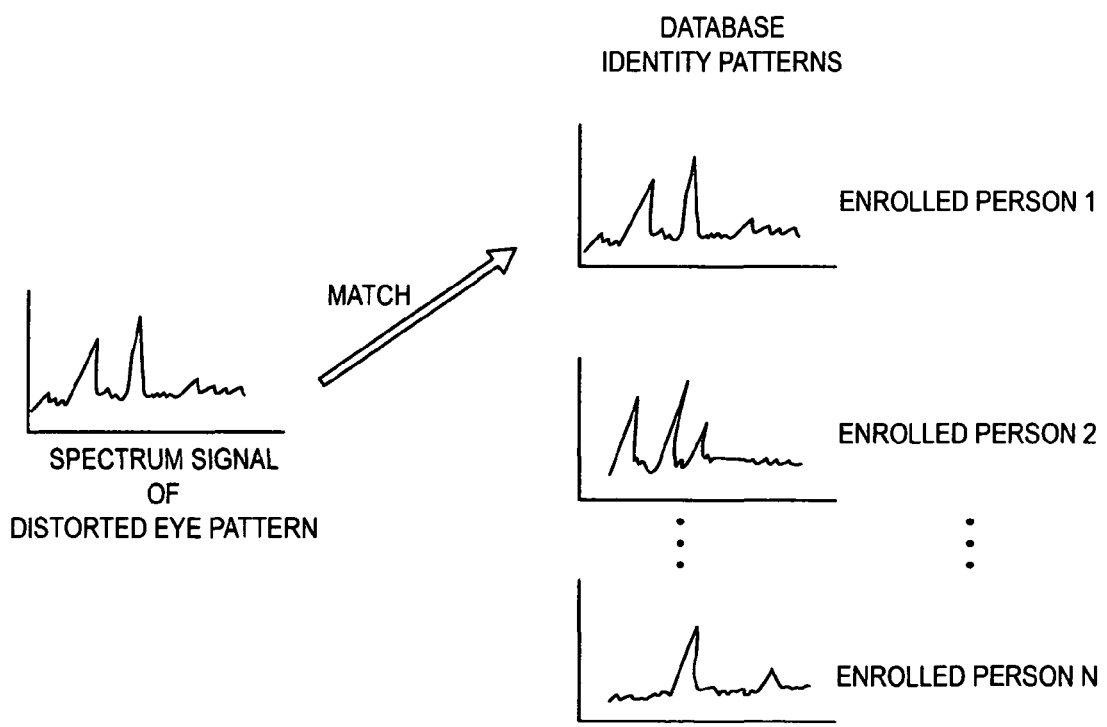
FIG. 4(b) is a diagram of a spectrum signal corresponding to the distorted eye pattern which is compared with enrolled distorted eye patterns during identification.

FIG. 4(b) shows an example of a signal generated by the spectrum analyzer for a distorted eye pattern. This signal includes peaks which vary based on the predetermined distortion imposed by lens 31 coupled with the person's original eye pattern. The peaks may correspond, for example, to light and opaque or different color portions of the detected pattern plotted against a time or spatial coordinate. If desired, a three-dimensional spectrum signal may be generated for the distorted eye pattern. Once this signal has been acquired, it is compared to spectrum signals corresponding to the identity patterns stored in the database to determine whether a match exists. A positive or negative confirmation of identification is then made based on the results. If desired, non-linear distortion lens 31 may be replaced by any of the optical arrangements previously discussed in connection with FIG. 3(c).

Figure 5A:
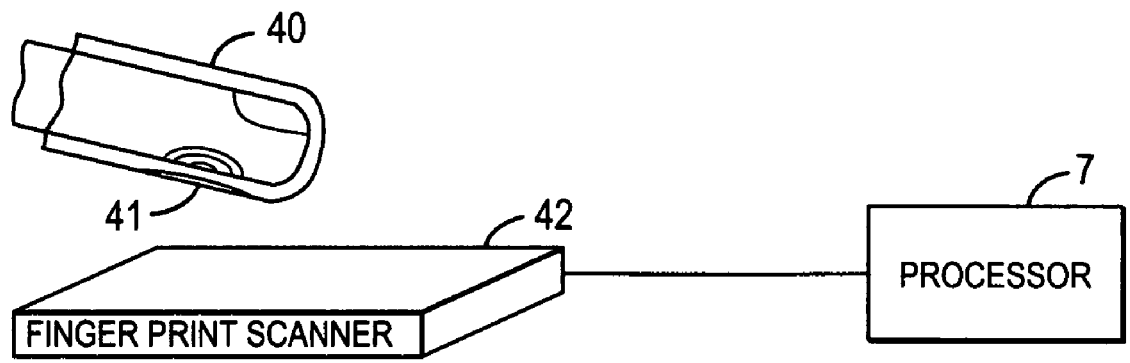
FIG. 5(a) is a diagram showing an identification system which operates based on a distorted fingerprint pattern in accordance with one embodiment of the present invention.

FIG. 5(a) shows an identification system adapted to receive a distorted biometric in the form of an altered fingerprint in accordance with the present invention. The fingerprint is altered using a fingerpiece 40 having a window 41 which includes a predetermined mask pattern. The mask pattern may include anyone of a number of geometric or random patterns, numbers, characters, symbols, or other indicia provided the pattern can be uniquely detected along with at least an identifiable portion of the fingerprint.

To allow adequate reading of the fingerprint, the mask is preferably made of a thin-film, flexible, transparent material. The pattern of the mask can be formed by imprinted opaque lines made sufficiently thin or small to allow the fingerprint to still be read through the mask. Lines of this type may be formed, for example, using known screen-printing or thin-film patterning techniques. To steady the mask, the supporting portions of the fingerpiece may be made of a rigid material such as plastic, metal, etc.

Figure 5B:
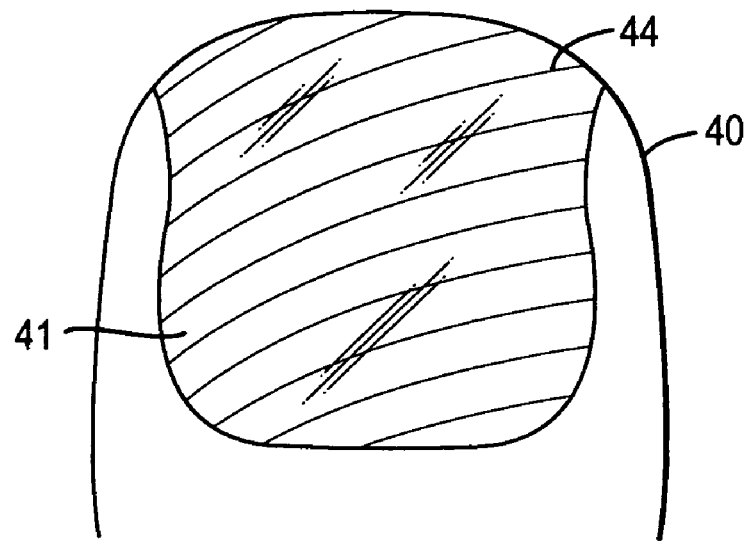
FIG. 5(b) shows a fingerpiece containing a first type of mask pattern which may be used to generate the distorted fingerprint pattern.

FIG. 5(b) is provided to show an example of a mask pattern 44 that might be included in accordance with the present invention. Using this mask, the fingerprint is encoded (or "signed") with a unique pattern or insignia that may be read by fingerprint scanner 42 for purposes of confirming a person's identity. The scanner may be an optical scanner, an ultrasonic scanner, or any other type of fingerprint reader known.

Figure 5C:
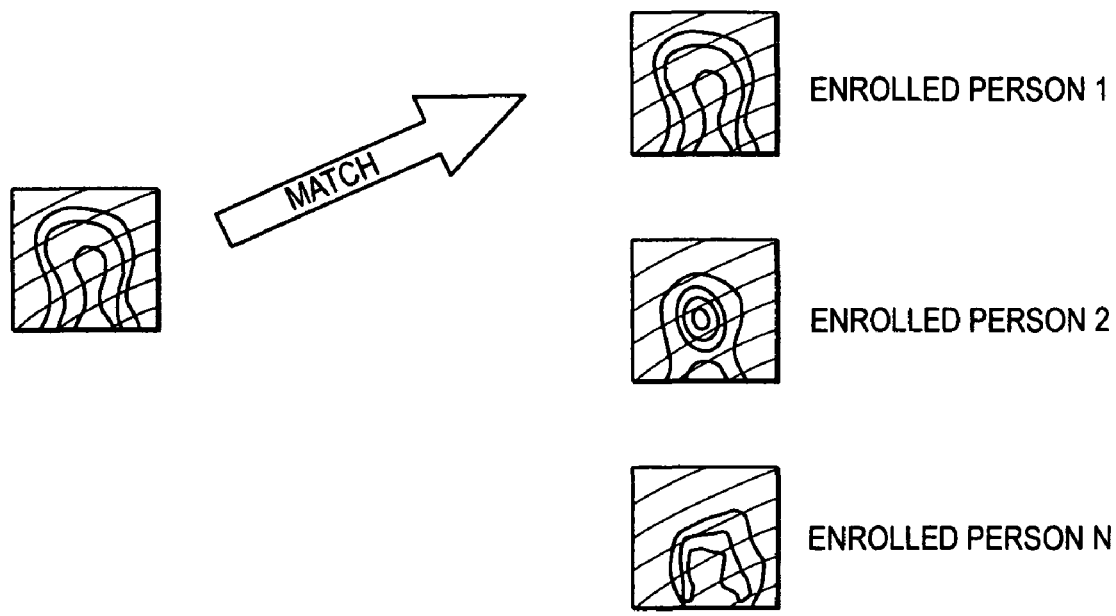
FIG. 5(c) is a diagram of a spectrum signal corresponding to the distorted fingerprint pattern

Once an image of the masked fingerprint is obtained, processor 7 performs a two-step analysis. First, the image is analyzed using a pattern recognition algorithm to determine whether the mask pattern is present in the image. In FIG. 5(b), the mask pattern is shown to be a cross-hatched pattern. If the mask pattern is found, the processor next recognizes the fingerprint pattern (which is still perceivable by the detector because of the thinness of the mask pattern lines) and then compares this pattern to fingerprint images (identity patterns) previously scanned into the database during enrollment-using the same mask. (See FIG. 5(c)). This pattern analysis is performed using known techniques, and a positive or negative identification result is returned based on the results.

Figure 5D:
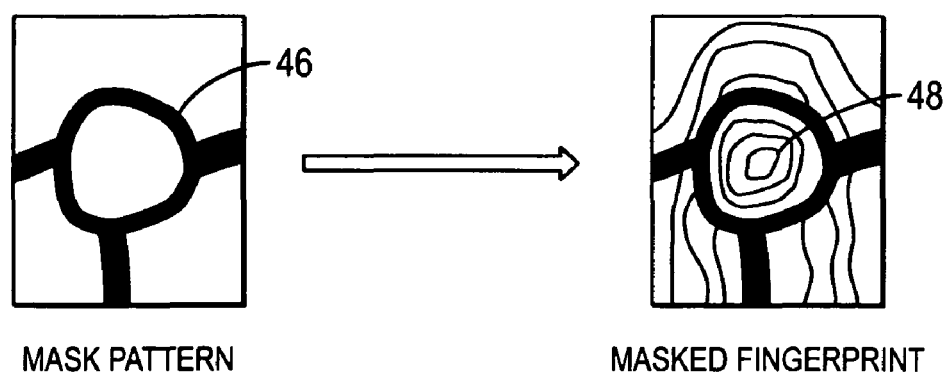
FIG. 5(d) shows a second type of mask pattern that may be used to generate a distorted fingerprint pattern in accordance with the present invention.

In a variation of the foregoing embodiment, the mask pattern may intentionally obscure selected portions of the fingerprint. The distorted print is then input into the system for subsequent pattern recognition. This variation therefore contemplates recognition of the unobscured portions of the fingerprint which may be sufficiently distinct to allow recognition to occur. FIG. 5(d) shows an example of this embodiment where a fingerpiece 45 including a pattern 46 is used to mask fingerprint 47 when captured by a fingerprint scanner. Pattern 46 includes thick lines which obscure areas surrounding a center region of the fingerprint. Research has shown that a very small percentage of the population (e.g., 1%) has so-called "whirl" fingerprint, i.e., a fingerprint where the innermost lines form a circle 48. By not obscuring the center region of the print, a whirl can be detected using a mask pattern 46 for purposes of accurate identification. Other very unique fingerprint patterns exist and mast patterns may be made to allow these patterns to be perceptible to a fingerprint detector. This an other embodiments described herein may be applied to recognizing distorted palm or thumb print biometrics.

Figure 5E:
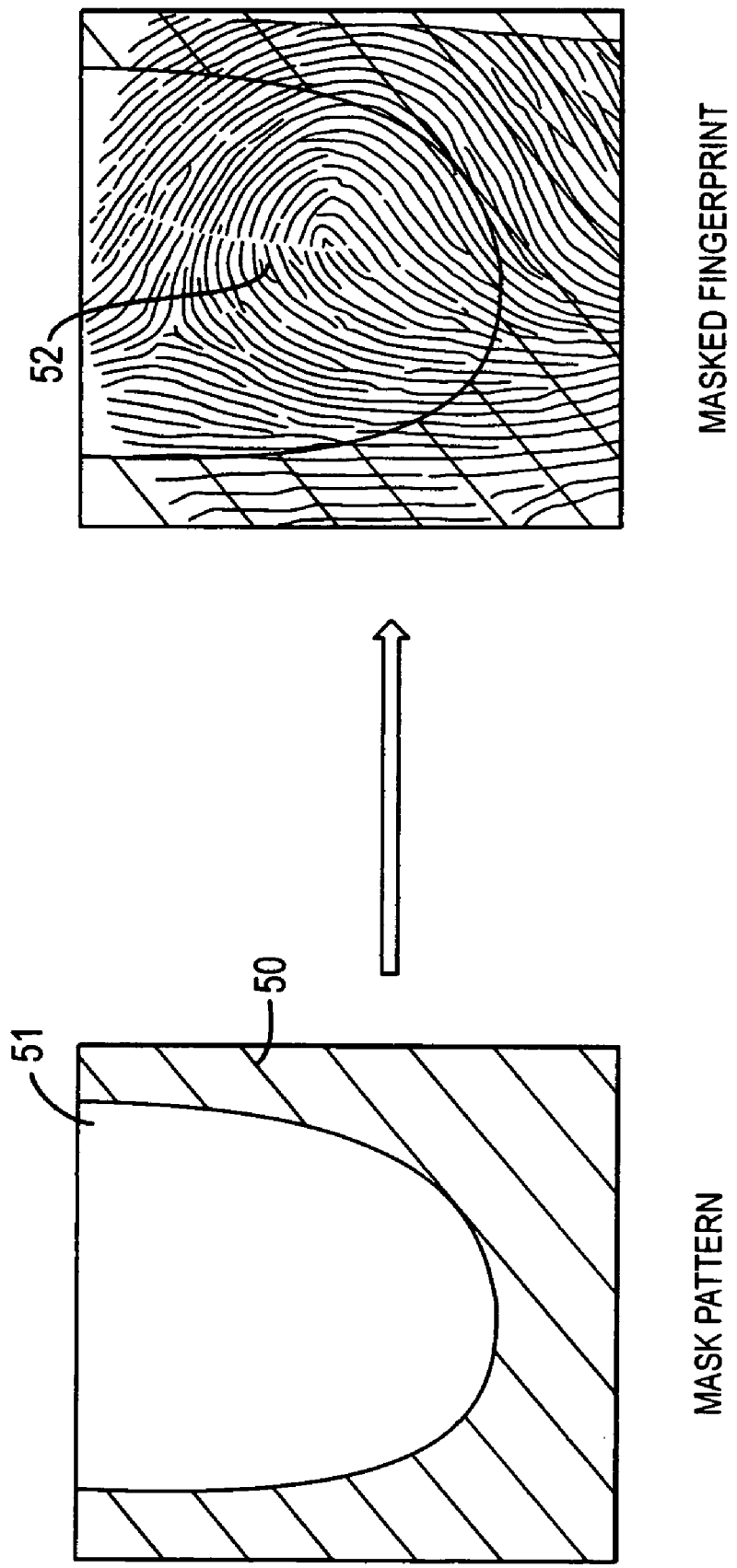
FIG. 5(e) shows a third type of mask pattern that may be used to generate a distorted fingerprint pattern in accordance with the present invention.

FIG. 5(e) shows another type of mask pattern 50 that may be incorporated into a fingerpiece in accordance with the present invention. This mask pattern leaves a space 51 wherein a predominant portion of a fingerprint 52 may be viewed, with the pattern itself being defined around a peripheral portion of this space.

Figure 5F:
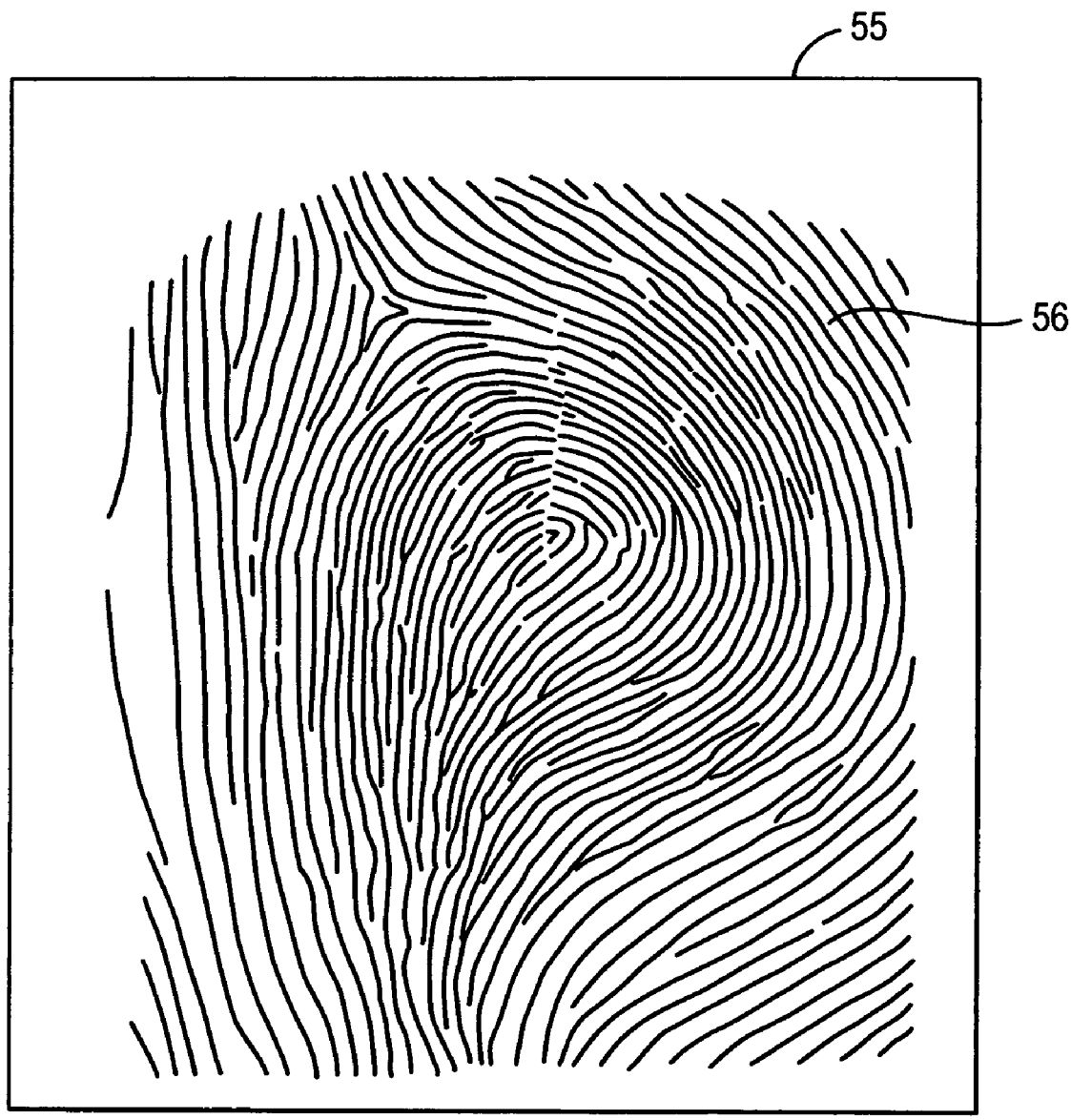
FIG. 5(f) shows a fourth type of mask pattern that may be used to generate a distorted fingerprint pattern in accordance with the present invention.

FIG. 5(f) shows another type of mask pattern 55 that may be incorporated into a fingerpiece in accordance with the present invention. This mask pattern includes an insignia comprising one or more letters or numbers forming an identifiable pattern that can be recognized by pattern recognition software connected to the detector.

Figure 6:
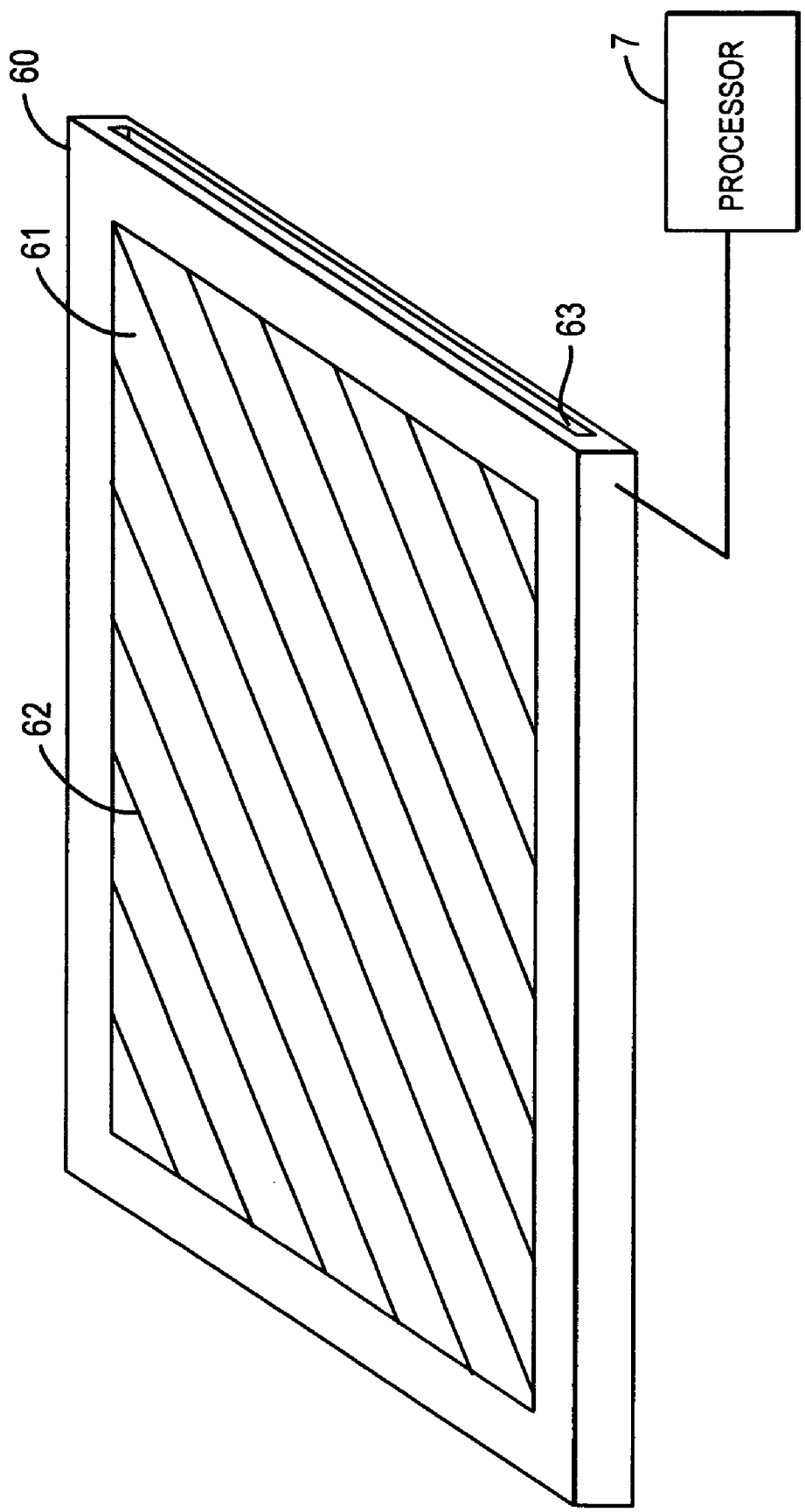
FIG. 6 is a diagram showing an identification system which operates based on a distorted fingerprint pattern in accordance with another embodiment of the present invention.

FIG. 6 shows a portion of an identification system in accordance with another embodiment of the present invention. Like the foregoing embodiment, this system is adapted to receive a distorted biometric in the form of an altered fingerprint. However, the fingerprint is detected by a fingerprint reader 60 which is adapted to receive a sheet 61 containing a mask pattern 62. The sheet is preferably made of a thin film of transparent material and the mask pattern may be any of those previously discussed herein. For illustrative purposes, the mask is shown as including a cross-hatched pattern. To accommodate the mask, the housing of the reader may include a hole 63 through which the mask is adapted to slide into position over a sensing surface. Alternatively, the top of the reader may be swing open by hinges to allow the mask to be put into place, preferably with the assistance of guide members on the housing of the reader.

In operation, a person to be identified places his finger onto the reader containing the mask. The reader may be any type previously mentioned, e.g., optical, ultrasonic, capacitive, piezoelectric, etc. The reader reads the fingerprint through the mask and generates an image signal, which is either directly compared to one or more enrolled images or converted into a spectrum signal for comparison to one or more enrolled spectrums. A positive or negative identification result is returned based on results of the comparison. Fingerprint recognition and comparison may be performed in accordance with any-one of a variety of known techniques. Examples are disclosed in *Intelligent Biometric Techniques in Fingerprint and Face Recognition*, CRC Press International Series on Computational Intelligence, (1999) by L. C. Jain et al.

Figure 7A:
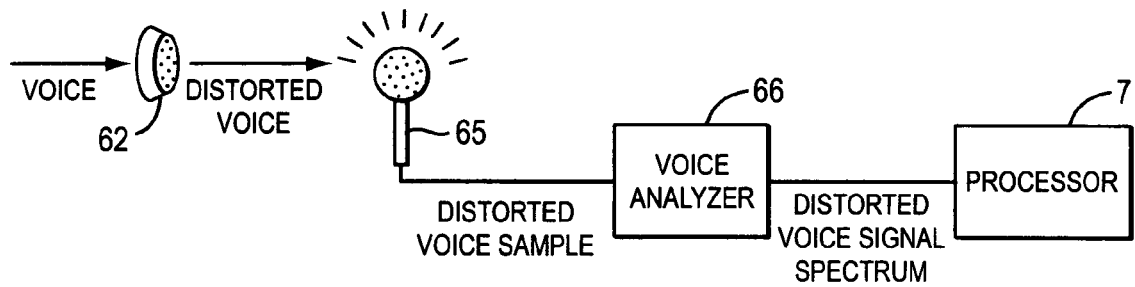
FIG. 7(a) is a diagram showing an identification system which operates based on a distorted voice sample in accordance with one embodiment of the present invention.
Figure 7B:
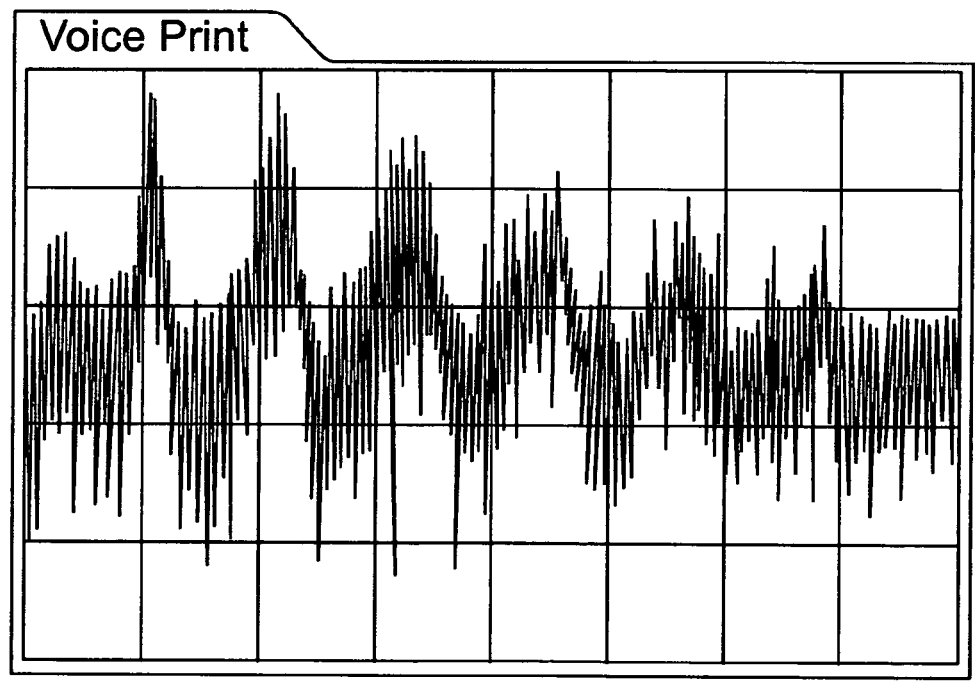
FIG. 7(b) shows a voice print that may be distorted in accordance with the present invention.

FIG. 7(a) shows an identification system which receives a distorted biometric in the form of an altered voice in accordance with the present invention. This system includes a distortion element 62, an input unit in the form of a microphone 65, and a voice analyzer 66, an output of which is connected either directly or indirectly to the identification decision unit shown in FIG. 1. The distortion element may be any one of a variety of known voice modulators, filters, scramblers, or encoders which alter characteristics of speech in a predetermined way. The input unit includes a microphone 65 for converting the altered voice output from the distortion element into an electrical signal. This signal is then converted into a distorted voice spectrum signal by voice analyzer 66 for comparison to enrolled voice spectrum signals by processor 7. FIG. 7(b) shows an example of a voice spectrum signal which may be subject to distortion and comparison for purposes of identifying a person in accordance with the present invention.

Figure 8A:
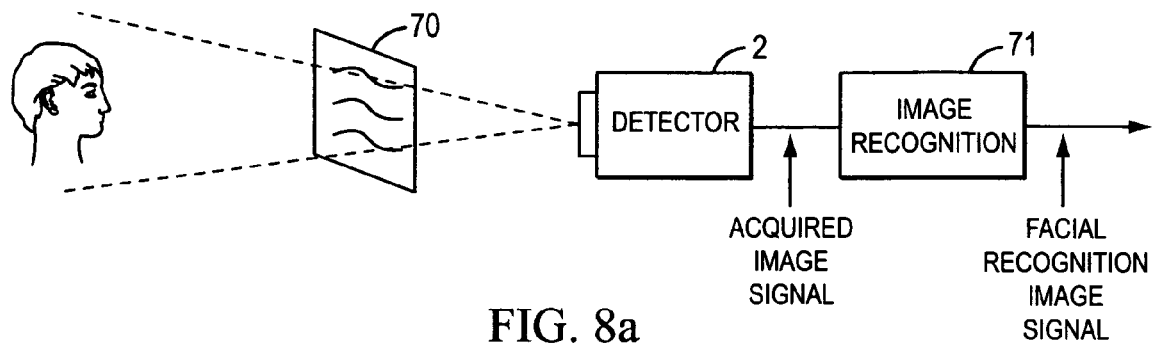
FIG. 8(a) is a diagram showing an identification system which operates based on a distorted facial image in accordance with one embodiment of the present invention.

FIG. 8(a) shows an identification system which receives a distorted biometric in the form of an altered facial image in accordance with the present invention. The system includes a distortion element 70, input unit 2 which includes a camera, CCD array, or other imaging device, and an image recognition unit 71. The distortion element alters the image of a person's face in predetermined manner prior to input into the system. This may be accomplished using a screen or mask pattern containing, for example, a diffraction or refraction pattern, anon-linear optical distortion pattern (e.g., one containing more fringes), a symbol or insignia, or any of the other types of mask patterns previously discussed. In operation, the camera converts the altered face detected through the distortion element into an image signal. Unit 71 isolates the altered face in the image signal and then performs facial recognition to derive a normalized image of the distorted face. This image is then compared with enrolled images by processor 7 until a positive or negative result of obtained.

Figure 8B:
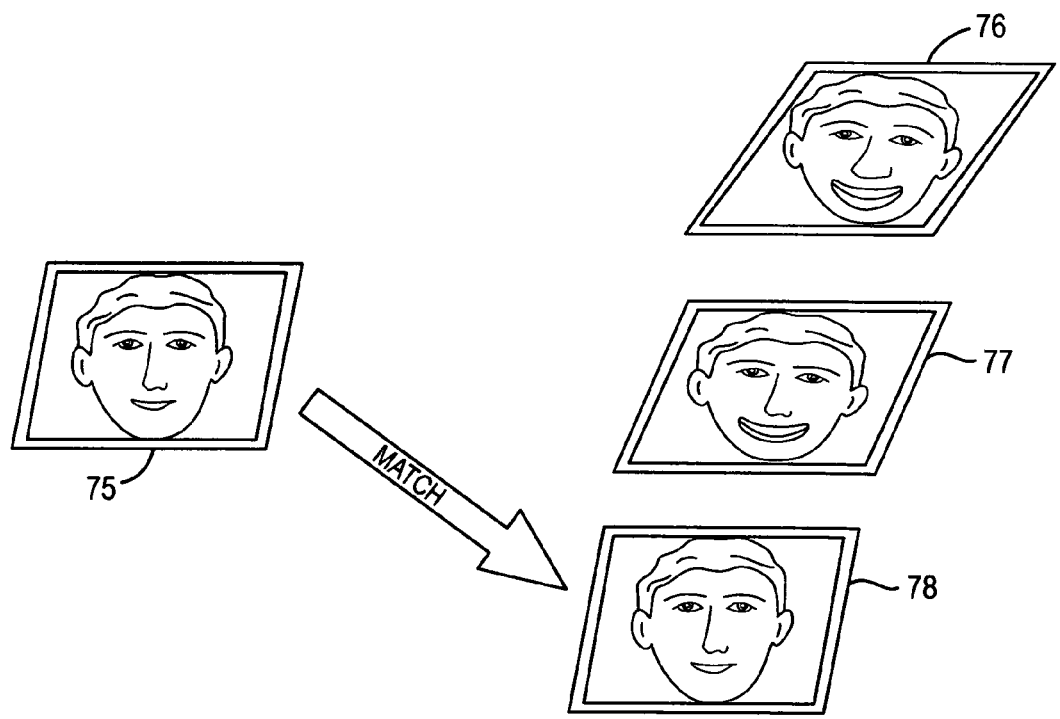
FIG. 8(b) shows an example of how a distorted image may be compared to stored distorted images by the system of the present invention for returning a positive or negative identification.

The facial recognition performed by unit 71 may be any one of a variety of techniques. Examples include but are not limited to eigenspace projection, statistical modeling, neural network analysis, or others such as disclosed in *Intelligent Biometric Techniques in Fingerprint and Face Recognition*, CRC Press International Series on Computational Intelligence, (1999) by L. C. Jain et al and the article *An Automated System for Detection, Recognition & Coding of Faces* by MIT Media Laboratory, Vision and Modeling Group. FIG. 8(*b*) shows example of image matching performed by processor 7 using an eigenspace protection technique. In this example, distorted facial image 75 is output from the image recognition unit and compared with enrolled distorted facial images 76, 77, and 78 to determine a match.

Figure 9A:
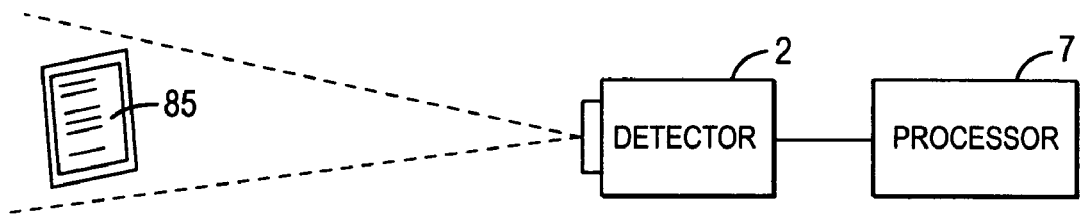
FIG. 9(a) is a diagram showing an identification system which operates based on a distorted DNA sample in accordance with one embodiment of the present invention.
Figure 9B:
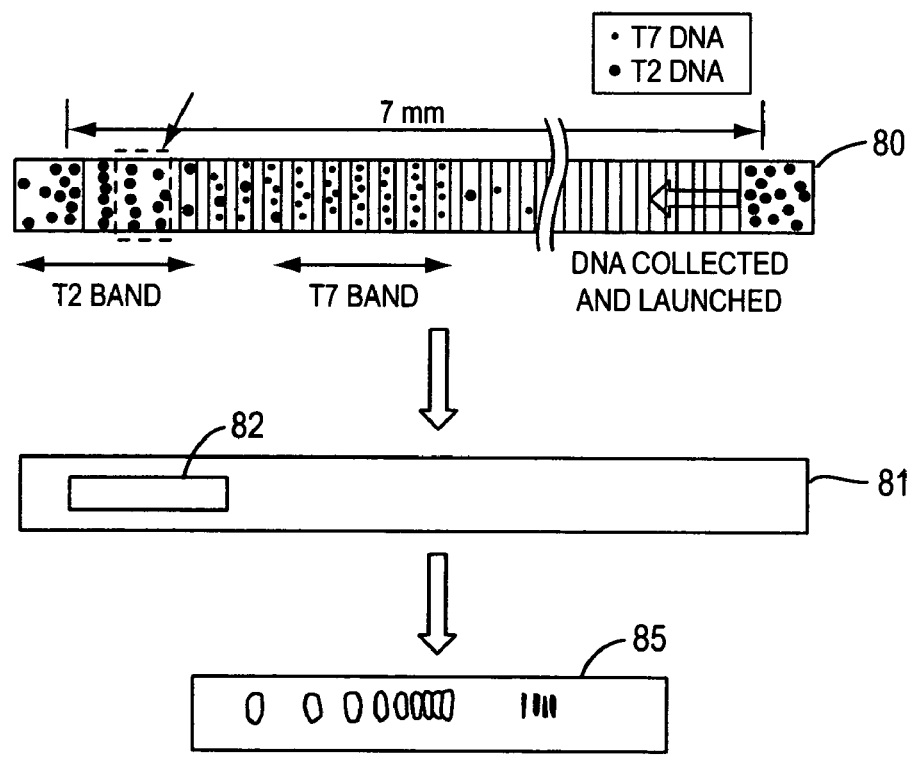
FIG. 9(b) shows one way in which the distorted DNA sample may be generated.

FIG. 9(*a*) shows an identification system which receives a distorted biometric in the form of an altered DNA sample in accordance with the present invention. This system includes an input unit 2 which includes a camera that captures an image of or otherwise reads a person's DNA pattern 85 which has been distorted or otherwise modified in a predetermined way. This image is then compared by processor 7 to other enrolled images using known pattern recognition techniques and a positive or negative identification result is returned. Many techniques are known for obtaining DNA samples, see, e.g., the article *Cornell Nano-Researchers Create Component for a 'lab on a chip' that cuts DNA separation from a day to a matter of minutes*, Cornell News, May 15, 2000. A distorted DNA sample may be generated in accordance with the present invention using any of these techniques.

FIG. 9(*b*) shows an example of how a modified DNA sample may be prepared in accordance with the present invention. First, a photograph or other medium bearing a person's DNA sequence 80 is made. A mask 81 containing one or more apertures 82 is then used to isolate predetermined bands of the DNA sequence which corresponds to and preferably uniquely identifies the person. Different masks may be used for different persons to ensure uniqueness to the system. A second photograph or medium is then made of the masked DNA sequence 85, which medium is preferably incorporated into a card, badge or other personal carrier. In operation, the person holds the carrier next to the camera, the masked pattern is detected, and the person's identification confirmed.

Figure 10A:
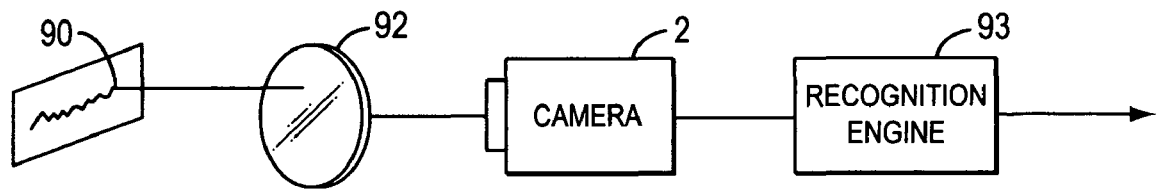
FIG. 10(a) is a diagram showing an identification system which operates based on a distorted handwriting sample in accordance with one embodiment of the present invention.
Figure 10B:
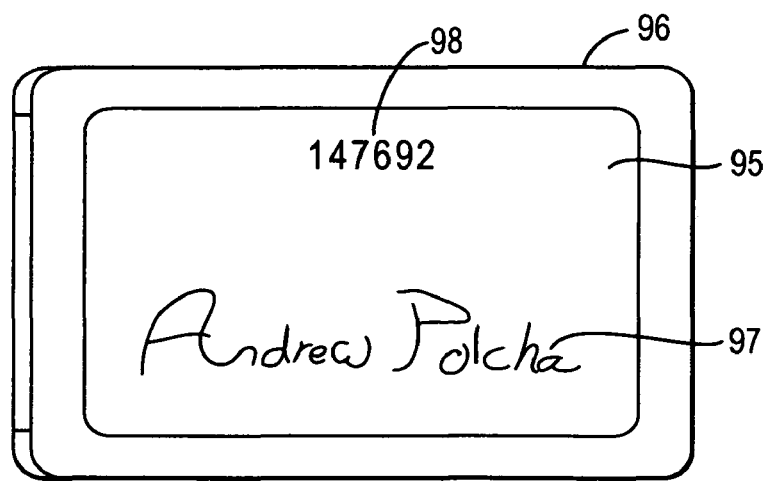
FIG. 10(b) is a diagram showing one type of distorted handwriting sample that may be subject to recognition by the present invention.

FIG. 10(*a*) shows an identification system which receives a distorted biometric in the form of an altered handwriting sample in accordance with the present invention. This system includes an input unit 2 which includes a camera for capturing an image of a handwriting sample 90 through a distortion element 92. A handwriting/pattern recognition engine 93 is then used to recognize the distorted handwriting sample output from element 92. The handwriting sample may be a signature on a driver's license, employee card, or any other sample. The distortion element may be a non-linear distortion lens or any of the other types of masks described herein.

FIG. 10(*b*) shows one type of mask 95 which may be used to distort the handwriting sample. The mask is a clear plastic film which is included in a leather card holder 96 containing a card on which a signature 97 is written. The film includes a serial number 98 so that when viewed by the camera the combined image includes the serial number superimposed over the handwriting sample. The recognition engine may therefore perform two steps. First, the engine recognizes the serial number on the mask. Second, the engine recognizes the person's handwriting sample. Processor 7 then compares this information to identity patterns in the database and returns a positive or negative confirmation result. Handwriting and serial number recognition may be performed using any one of a variety of known techniques.

Figure 11:
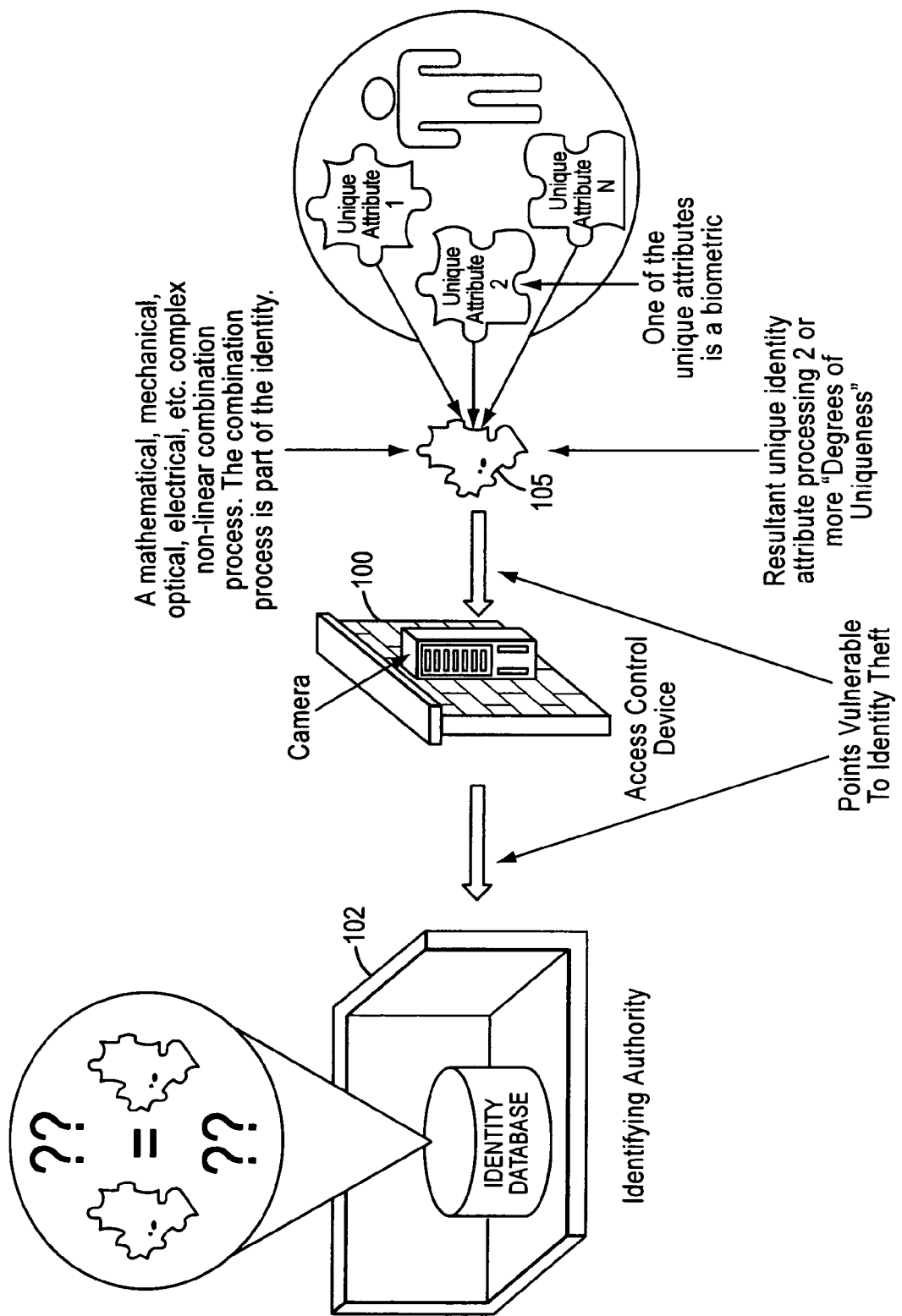
FIG. 11 is a diagram showing a biometric identification system in accordance with another embodiment of the present invention.

FIG. 11 is a conceptual drawing showing another embodiment of a system for identifying a person in accordance with the Recoverable Biometric Identity system of the present invention. This system may include the same elements as shown in FIG. 1, e.g., access control device 100 may include or correspond to input unit 2 and an identifying authority 102 may include or correspond to identification decision unit 3 and database 4. However, unlike the Recoverable Biometric Identity system of FIG. 1, instead of one distorted biometric, multiple distorted biometrics are input into the system. As previously discussed above, by distorting the biometric before it is input into the system, the present invention ensures that system security cannot be breached by theft of the biometric itself. The distortion element therefore in effect serves as a key which when combined with the biometric provides two degrees of uniqueness which must be satisfied before a positive identification result can be confirmed. Moreover, if the distorted biometric of a person is ever lost or stolen, the present invention can easily re-enroll biometrics into the system or switch to a different previously enrolled biometric altered using a different unique distortion element. If there is a security breach, stolen biometric-based identities with two or more degrees of uniqueness are replaceable. The originally combined biometrics can be separated such that the distortion element can be changed, modified, or replaced. Then, the replaced distortion element can be recombined with the biometric data and re-enrolled into the system. Additional embodiments, according to the present teachings, that combine three or more degrees of uniqueness can provide an even greater level of security.

The multiple biometrics may include any of those previously discussed. For example, a first unique attribute may be an eye pattern distorted by a second unique attribute in the form of a non-linear distortion lens. A third unique attribute may be a fingerprint distorted by a fourth unique attribute in the form of a mask. These attributes may be input sequentially into the system and compared to enrolled information for returning a positive or negative identification result.

One variation involves combining multiple unique identities prior to input into the system. For example, referring to FIG. 11, unique attribute 1 may be an eye pattern which is distorted by a unique attribute 2 in the form of a non-linear distortion lens. The lens may also include in a non-distorted portion a unique attribute 3 in the form of a serial number. The output of the non-linear distortion lens therefore corresponds to a combined biometric 105 having three degrees of uniqueness, i.e., the undistorted eye pattern, the distorted image of the eye pattern output from the lens, and the serial number which can also be seen in the lens output. Once formed, the combined biometric is detected by a camera in the access control device and compared to identity patterns previously been enrolled using the same non-linear distortion lens and serial number. A positive or negative identification result is returned based on a result of the comparison.

In any of the aforementioned embodiments, one of the unique attributes may be a personal identification number (PIN) or password. This number may be combined with or entered separately or sequentially with the distorted biometric at, for example, a keypad at the input unit. The use of a PIN or password will provide an additional basis for identifying a person.

Another embodiment of the present invention includes a computer-readable medium storing a program which automatically performs the processing functions or steps of the methods previously described. This computer-readable medium may be a hard drive, a compact disk, a floppy disk, a memory chip, a flash memory, or any other type of medium capable of storing digital information. The processor that executes the program preferably performs the functions of decision unit 3 shown in FIG. 1. This processor may be incorporated into a desktop or portable computer (e.g., laptop, notebook, personal digital assistant (PDA), web-enabled phone, computer tablet), the control panel or input device of an access control system, or any other electronic system where identification, access control, or security is required.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. An identification device, comprising:
a biometric input device for receiving distorted biometric information to determine an identity of a person; and
a portable distortion element that is:
   (a) separate from and external to the biometric input device;
   (b) separate from an actual biometric of the person and removably imposed on the actual biometric such that imposing the portable distortion element on the actual biometric is performed external to the biometric input device; and
   (c) when imposed on the actual biometric of the person, configured to modify the actual biometric to generate the distorted biometric information before entering the information into the biometric input device and modification of the actual biometric prevents entry of raw data representing the actual biometric of the person into the biometric input device.

2. The device of claim 1, further comprising:
the distortion element selected from a group consisting of:
a lens having a non-linear optical pattern which generates a distortion of an eye pattern and the lens is included in an eyepiece carried by the person;
a diffraction grating which modulates the eye pattern to generate the distorted biometric information and the diffraction grating is electronically generated adjacent to or within the lens;
a modulator which modulates a frequency signal with a voice signal from the person to generate the distorted biometric information;
a DNA mask which isolates predetermined portions of a DNA sample to generate the distorted biometric information; and
a lens having a non-linear optical pattern which generates a distortion of a facial pattern and the facial pattern is shown through and distorted by the lens.

3. The device of claim 1, further comprising:
a camera which captures a distorted eye pattern output from the distortion element.

4. An identification device, comprising:
a biometric input device for receiving distorted biometric information to determine an identity of a person; and
a portable distortion element that is:
   (a) separate from and external to the biometric input device;
   (b) separate from an actual biometric of the person and removably imposed on the actual biometric such that imposing the portable distortion element on the actual biometric is performed external to the biometric input device; and
   (c) when imposed on the actual biometric of the person, configured to modify the actual biometric to generate the distorted biometric information before entering the information into the biometric input device and wherein inputting raw data representing the actual biometric of the person into the biometric input device causes a failed recognition of the identity of the person.

5. An identification method, comprising:
receiving distorted biometric data representing multiple degrees of uniqueness into a biometric input device to determine an identity of a person;
imposing a portable distortion element on an actual biometric of the person to modify the actual biometric to generate the distorted biometric data by combining multiple unique attributes before entering the data into the biometric input device and to prevent entry of raw data representing the actual biometric of the person into the biometric input device, wherein the portable distortion element is separate from and external to the biometric input device;
generating the distorted biometric data by combining at least one unique personal biometric data in a non-linear manner with at least one non-biometric data wherein each biometric data and non-biometric data is associated with a unique attribute and wherein combining the at least one unique personal biometric data with the at least one non-biometric data is performed external to the biometric input device; and
preventing identity theft of the raw data of the actual biometric of the person when a system compromise occurs by providing the portable distortion element to function as a security key, wherein the portable distortion element provides at least a first degree of uniqueness and the actual biometric data provides at least a second degree of uniqueness;
combining the portable distortion element and the actual biometric data to provide multiple degrees of uniqueness such that a positive identity confirmation of the person requires verification of the multiple degree of uniqueness, collectively, within the combination.

6. The method of claim 5, wherein the receiving step includes:
receiving a signal indicative of a combination of two or more unique identity attributes, at least one of the unique attributes corresponding to a biometric of a person and at least another one of the unique identity attributes is a predetermined distortion pattern, said signal indicative of a distortion of the biometric using the predetermined distortion pattern;
comparing the signal to one or more identity patterns; and
determining the identity of the person based on results of said comparison.

7. The method of claim 6, wherein each of the distorted patterns
corresponds to a distorted biometric of a respective one of a plurality of persons having a known identity;
wherein the distorted biometric is generated using a unique distortion element selected from a group consisting of:
the unique distortion element is a lens which distorts an eye pattern and the lens is included in an eyepiece carried by the person; and the unique distortion element is a voice scrambler which distorts a voice and the voice scrambler is carried by the person.

8. The method of claim 6, further comprising:
acquiring a distorted biometric using an imaging system.

9. The method of claim 8, wherein the acquiring step includes:
using an imaging system to acquire a distorted facial pattern.

10. The method of claim 6, wherein the receiving step includes:
receiving a signal output from the distortion element which distorts a fingerprint.

11. The method of claim 6, further comprising:
storing the distortion patterns in at least one of a database and a memory chip, and
wherein each of the distortion patterns corresponds to a distorted biometric of a respective one of a plurality of persons having a known identity.

12. The method of claim 6, wherein said one or more identity patterns are stored in at least one of a database, a memory, a memory chip and a computer-readable medium.

13. The method of claim 6, wherein each of the distortion patterns corresponds to a distorted biometric of a respective one of a plurality of persons having a known identity.

14. The method of claim 5, further comprising:
detecting the distorted biometric data using a detector;
comparing, using a processor, the distorted biometric data with a previously enrolled distorted biometric data; and
determining, using the processor, the identity of the person based on a result of the comparison.

15. The method of claim 5, wherein the distortion element comprises a diffraction grating; and
wherein the diffraction grating modulates an eye pattern to generate a distorted biometric and the diffraction grating is electronically generated adjacent to or within a lens.

16. The method of claim 5, further comprising:
detecting a distorted facial pattern shown through and distorted by the distorted element to generate a distorted biometric, wherein the distortion element includes a lens having a non-linear optical pattern.

17. The method of claim 5, further comprising:
detecting an eye pattern through the distortion element which generates a distorted biometric.

18. The method of claim 5, further comprising:
detecting a distorted biometric for input into an identification system;
comparing the distorted biometric to one or more distortion patterns;
determining the identity of the person based on results of said comparison; and
determining the person has an unknown identity if no match results from the comparison.

19. The method of claim 5, wherein each non-biometric data is associated with a tangible device that is capable of being physically separated therefrom the at least one unique personal biometric data.

20. The method of claim 5, wherein the distortion element comprises a mask pattern;
wherein the mask pattern having at least one characteristics selected from a group consisting of:
the mask pattern is superimposed over at least a portion of a fingerprint, the mask pattern does not obscure the fingerprint, and
the mask pattern is included in a window of a finger piece which fits over a finger of the person.

21. The method of claim 20, wherein the mask pattern is included on a medium placed over a fingerprint reader and the distortion pattern includes a non-linear distortion pattern.

22. An identification device, comprising:
a biometric input device for receiving distorted biometric information to determine an identity of a person;
a distortion element imposed on an actual biometric of the person and configured to modify the actual biometric to generate the distorted biometric information before entering the information into the biometric input device and modification of the actual biometric prevents entry of raw data representing the actual biometric of the person into the biometric input device; and
a mask worn over a finger, said mask including the distortion element which distorts a fingerprint to generate the distorted biometric information.

23. An identification device, comprising:
a biometric input device for receiving distorted biometric data representing multiple degrees of uniqueness to determine an identity of a person;
a portable distortion element for imposing a distortion on an actual biometric of the person to modify the actual biometric to generate the distorted biometric data by combining multiple unique attributes before entering the data into the biometric input device and to prevent entry of raw data representing the actual biometric of the person into the biometric input device, wherein the portable distortion element is separate from and external to the biometric input device;
wherein the distorted biometric data is generated by combining at least one unique personal biometric data in a non-linear manner with at least one non-biometric data wherein each biometric data and non-biometric data is associated with a unique attribute and wherein combining the at least one unique personal biometric data with the at least one non-biometric data is performed external to the biometric input device; and
an identity theft prevention mechanism for preventing identity theft of the raw data of the actual biometric of the person when a system compromise occurs by providing the portable distortion element to function as a security key, wherein the portable distortion element provides at least a first degree of uniqueness and the actual biometric data provides at least a second degree of uniqueness and combining the portable distortion element and the actual biometric data to provide multiple degrees of uniqueness such that a positive identity confirmation of the person requires verification of the multiple degree of uniqueness, collectively, within the combination.

* * * * *